C. H. PELTON.
DRILL.
APPLICATION FILED JAN. 22, 1913.

1,072,869.

Patented Sept. 9, 1913.

Witnesses
G. Howard Walmsley.
Harriet L. Hammaker.

Inventor
Charles H. Pelton,
By Toulmin & Reed
Attorneys

COLUMBIA PLANOGRAPH CO., WASHINGTON, D. C.

UNITED STATES PATENT OFFICE.

CHARLES H. PELTON, OF SPRINGFIELD, OHIO, ASSIGNOR TO THE THOMAS MANUFACTURING COMPANY, OF SPRINGFIELD, OHIO, A CORPORATION OF OHIO.

DRILL.

1,072,869. Specification of Letters Patent. Patented Sept. 9, 1913.

Application filed January 22, 1913. Serial No. 743,454.

*To all whom it may concern:*

Be it known that I, CHARLES H. PELTON, a citizen of the United States, residing at Springfield, in the county of Clark and State of Ohio, have invented certain new and useful Improvements in Drills, of which the following is a specification, reference being had therein to the accompanying drawing.
This invention relates to drills such as are commonly used for placing in the ground seed or fertilizer. Heretofore much difficulty has been experienced in utilizing the same drill for planting seed and distributing fertilizer.

The object of the present invention is to provide a drill which will satisfactorily distribute the ordinary commercial fertilizers and will also satisfactorily plant seeds of various kinds, and particularly the vegetable fertilizers, such for example as vetch, the seed of which is small and brittle.

To this end it is a further object of the invention to provide the hopper of the drill with an adjustable discharge opening having means mounted on the exterior of the drill for regulating the size of the opening, this means comprising a gage which indicates to the operator the exact size and shape of the discharge openings in the hopper; to provide each discharge opening with a reduced portion and a cut-off to close all of the discharge opening except the reduced portion thereof, thus providing a discharge opening of the proper size to handle the particular seed which is to be planted; and it is also an object of the invention to provide a toothed feeding device for feeding the material to the discharge opening and having the edges of those portions of the teeth which pass over the discharge opening cut away to provide ample clearance and prevent the crushing or breaking of the seeds.

Figure 1:
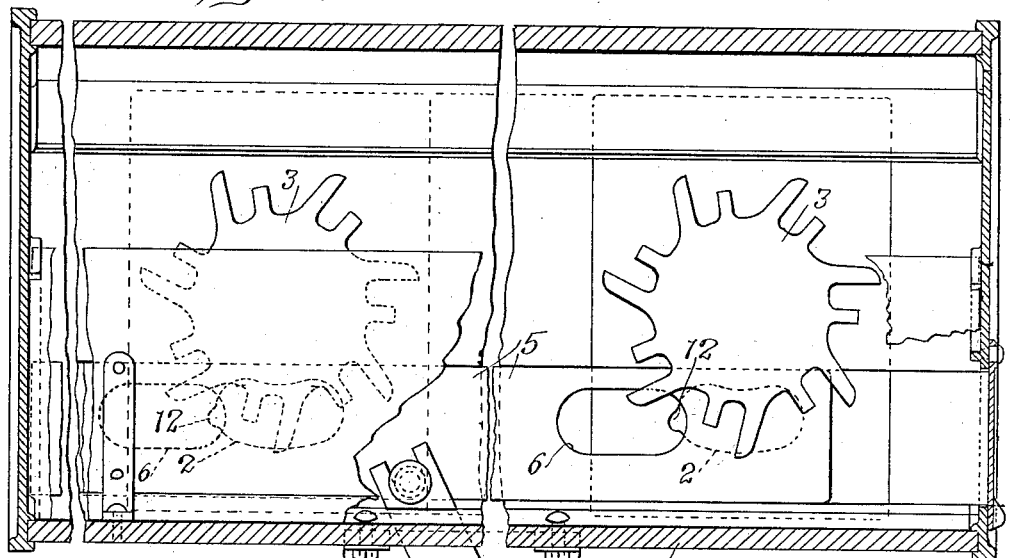
Figure 2:
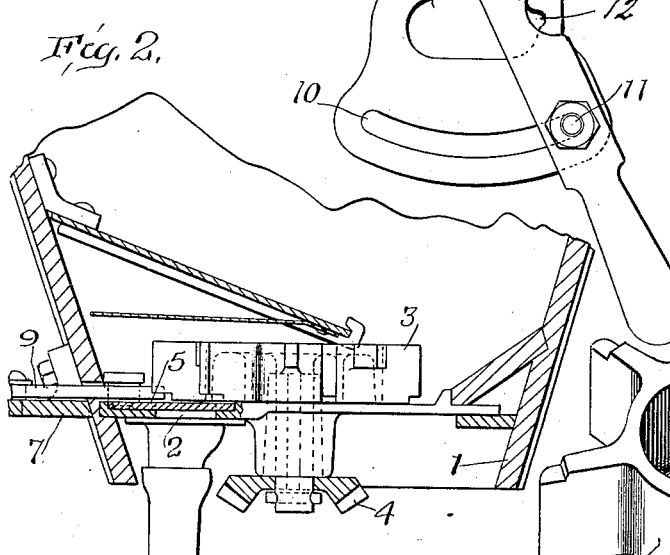
Figure 3:
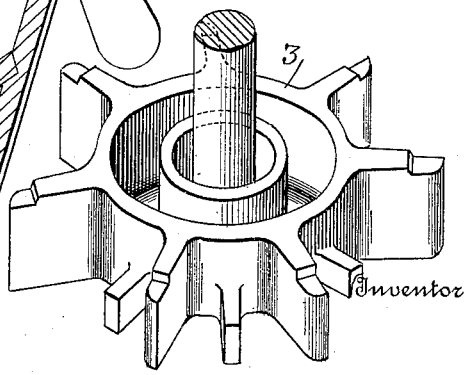

In the accompanying drawings, Figure 1 is a horizontal section of a portion of the hopper of a drill showing my invention in plan; Fig. 2 is a transverse section of a portion of such a drill; and Fig. 3 is a perspective view of one of the feeding devices, showing the same in an inverted position.

In these drawings I have shown the invention as applied to a drill or fertilizer distributer, the main features of construction of which are similar to those of the machine shown and described in my co-pending application for patent filed Dec. 27th, 1910, Ser. No. 599,312.

Inasmuch as many features of the drill are of well known type and their operation is understood by those familiar with the art I have illustrated only such parts of the mechanism as are directly related to the present invention and are necessary to an understanding thereof.

In the form of the device here shown the feeding mechanism is mounted in the bottom of a hopper 1 comprising the usual sloping front and rear walls and flat bottom, the latter being provided with a series of discharge openings 2 which preferably are oblong in shape and as having their ends rounded. Feeding devices comprising rotary toothed members 3 are journaled in the bottom of the hopper with their teeth extending across the respective feed openings 2. These feeding devices are provided with gears 4 by means of which they are positively driven from any suitable source of power, such as the usual connection with the ground wheels. A suitable cut-off is provided by means of which the size of the discharge openings can be regulated from the exterior of the hopper. As here shown this cut-off comprises a plate 5 slidably mounted on one side of the hopper, extending across the discharge opening and having openings 6 corresponding substantially in size and shape to the discharge openings of the hopper and adapted to be moved into partial or complete registration with the respective discharge openings or to be moved entirely out of registration therewith to cut off the flow of material through said discharge openings.

Owing to the varieties of materials fed through the discharge openings it is desirable that the operator should be able to observe the exact size of the openings and to gage the quantity of material fed in this way rather than by the use of a graduated scale showing the amount of material fed either in pounds or otherwise. I have, therefore provided on the outside of the hopper a gage corresponding substantially in shape and size to the discharge opening and have provided a member adapted to move over this gage to expose different portions thereof. This movable member is operatively connected with the slidable plate 5 and this connection is such that the exposed portion of the gage corresponds exactly with the size and shape of the uncovered portions of the discharge openings in the hopper. In that form of the device here shown I have secured a substantially horizontal bracket 7 to the rear wall of the hopper and have formed in the same an opening 8 similar to the discharge openings in the hopper. Pivotally mounted on this bracket is a lever 9, the inner end of which projects through the wall of the hopper and is connected with the sliding plate 5. The rear portion of the lever extends across the gage opening 8 and is provided at its outer end with a handle. Preferably, the bracket has a curved slot 10 and a bolt 11 extends through the lever and the slot to enable the lever to be held in adjusted positions either by tightening the bolt down to form a positive lock or by merely tightening it sufficiently to frictionally hold the lever. While it is not necessary that the gage should comprise an opening through the plate this is preferable inasmuch as it can be very readily observed even while the machine is in motion over the rough ground and further it will not fill with dirt or become obscured by rust or in any other manner. That edge of the lever adjacent to the reduced extension in the gage opening may be so arranged with relation to the gage opening and to the discharge opening in the hopper that it will indicate approximately the extent to which the discharge opening has been opened, or, if desired, the edge of the lever may be cut away so that it will conform substantially in shape to the end of the opening in the slide, thus enabling the exact size of the discharge opening to be indicated on the gage.

In order that small seeds, such, for example, as vetch seed, may be fed in the desired quantities I have provided each of the discharge openings with a reduced portion or extension 12 at one end thereof and have so arranged the discharge openings and the corresponding openings in the cut-off plate 5 that this plate can be moved into a position to close all of each discharge opening except the reduced portion or the reduced portion and a small portion of the main opening immediately adjacent thereto, thus providing a reduced discharge opening of the size necessary to handle the particular seed which is to be planted. In this manner I am able to secure a very wide range of sizes in my discharge opening and am enabled to handle materials of widely different characteristics.

To prevent any tendency on the part of the teeth of the feeding device to pinch the seeds against the end of the opening in the cut-off plate and thus break or otherwise injure them in such a manner as to prevent their proper propagation I prefer to cut away the lower edges of those portions of the teeth which pass over the reduced discharge opening so as to afford ample clearance. At the same time the teeth are not altered in a manner which will materially affect the proper feeding of other materials.

The operation of the mechanism will be understood from the foregoing description and it will be apparent that I have provided a drill which will satisfactorily handle materials of widely different characters, such, for example, as the commercial fertilizers, which are often lumpy and if the least bit damp are difficult to feed and require a large opening, and also the small hard seeds, such as vetch above mentioned, and that these seeds will be positively fed through the discharge openings without injury thereto. Further, it will be apparent that I have provided a very simple, practical and easily operated device for regulating the size of the discharge openings, thus enabling them to be adapted to different materials or to be adjusted to vary the quantity of material fed; and that this adjustment can be readily made while the machine is in operation.

While I have shown and described one embodiment of my invention it will be understood that this has been chosen for the purpose of illustration only and that I do not desire to be limited to the details of construction shown and described, for obvious modification will occur to a person skilled in the art.

Having thus fully described my invention, what I claim as new and desire to secure by Letters Patent, is:—

1. The combination, with a hopper having a discharge opening, a device to feed the material through said opening, a plate movably mounted in said hopper and arranged to open and close said opening, a gage outside of said hopper corresponding substantially in size and shape to said discharge opening, a member mounted to move over said gage, and an operative connection between said member and said movable plate, whereby the position of said member with relation to said gage will indicate the position of said movable plate with relation to said discharge opening.

2. The combination, with a hopper having a discharge opening, a device to feed the material to said opening, a plate slidably mounted in said hopper and having an opening adapted to be moved into partial or complete registration with said discharge opening, a gage outside of said hopper corresponding substantially in size and shape to said discharge opening, a member mounted to move over said gage, and an operative connection between said member and said slidable plate, whereby the position of said member with relation to said gage will indicate the extent to which the opening in said slidable plate registers with said discharge opening.

3. The combination, with a hopper having a discharge opening, a device to feed material to said opening, a plate slidably mounted in said hopper and having an opening adapted to be moved into partial or complete registration with said discharge opening, a bracket mounted outside of said hopper and having an opening corresponding substantially to said discharge opening, a lever arranged to move over said opening in said bracket and connected with said slidable plate, whereby the position of said lever with relation to the opening in said bracket will indicate the extent to which the opening in said slidable plate registers with said discharge opening.

4. In a machine of the character described, a hopper, a discharge opening in said hopper comprising a main portion and having a reduced extension at one end thereof, a plate slidably mounted above said opening and having an opening therein of substantially the size of the main portion of said discharge opening and adapted to be moved into and out of registration with said main portion of said discharge opening, the openings in said plate and said discharge opening being so arranged that said plate may be moved into position to close all of said discharge opening except said extension thereto.

5. In a machine of the character described, a hopper, a discharge opening in said hopper having a reduced extension at one end thereof, a plate slidably mounted above said opening and having an opening therein adapted to be moved into and out of registration with said discharge opening, the opening in said plate and said discharge opening being so arranged that said plate may be moved into position to close all of said discharge opening except said extension thereto, a bracket mounted outside of said hopper and having an opening therein corresponding substantially in size and shape to said discharge opening and the extension therein, a member adapted to move over the opening in said bracket, and an operative connection between said member and the plate in said hopper.

6. In a machine of the character described, a hopper, a discharge opening in said hopper having a reduced portion and a cut-off arranged to close the main portion of said opening without closing said reduced portion thereof, and a toothed member to feed the material to the open portion of said discharge opening, the teeth of said member having the edges of those portions thereof which pass over said open portion of said discharge opening cut away.

7. In a machine of the character described, a hopper, a discharge opening in said hopper having a reduced portion and a cut-off arranged to close the main portion of said opening without closing said reduced portion thereof, a toothed member to feed the material to the open portion of said discharge opening, the teeth of said member having the edges of those portions thereof which pass over said open portion of said discharge opening cut away, a gage mounted outside of said hopper and corresponding in size and shape to said discharge opening, a member mounted to move over said gage, and an operative connection between said member and said cut-off whereby the position of said member with relation to said gage will indicate the position of said cut-off with relation to said discharge opening.

In testimony whereof, I affix my signature in presence of two witnesses.

CHARLES H. PELTON.

Witnesses:
C. A. SCHAEDER,
C. E. THOMAS.